United States Patent
Arcos et al.

(10) Patent No.: US 12,465,495 B2
(45) Date of Patent: Nov. 11, 2025

(54) INTERVERTEBRAL DEVICES

(71) Applicant: AXIS SPINE TECHNOLOGIES LTD, St. Albans (GB)

(72) Inventors: Jonathan Arcos, St. Albans (GB); Christopher Reah, St. Albans (GB); Charles Barfield, Hernando, MS (US)

(73) Assignee: AXIS SPINE TECHNOLOGIES LTD, Reading (GB)

( * ) Notice: Subject to any disclaimer, the term of this patent is extended or adjusted under 35 U.S.C. 154(b) by 708 days.

(21) Appl. No.: 17/763,191

(22) PCT Filed: Sep. 24, 2020

(86) PCT No.: PCT/GB2020/052326
§ 371 (c)(1),
(2) Date: Mar. 23, 2022

(87) PCT Pub. No.: WO2021/058971
PCT Pub. Date: Apr. 1, 2021

(65) Prior Publication Data
US 2022/0339000 A1      Oct. 27, 2022

(30) Foreign Application Priority Data

Sep. 24, 2019   (GB) ..................................... 1913778

(51) Int. Cl.
*A61F 2/44*       (2006.01)
*A61F 2/30*       (2006.01)

(52) U.S. Cl.
CPC .... *A61F 2/447* (2013.01); *A61F 2002/30266* (2013.01); *A61F 2002/30383* (2013.01);
(Continued)

(58) Field of Classification Search
CPC ........ A61F 2/442; A61F 2/4445; A61F 2/443; A61F 2/4435; A61F 2/444; A61F 2/447
See application file for complete search history.

(56) References Cited

U.S. PATENT DOCUMENTS 6,045,579 A       4/2000 Hochshuler et al.
9,883,953 B1 *    2/2018 To ........................ A61F 2/4465
(Continued)

FOREIGN PATENT DOCUMENTS

WO    2014093136 A1    6/2014
WO    2016019241 A1    2/2016
WO    2019023251 A1    1/2019

OTHER PUBLICATIONS

International Search Report issued in priority PCT filing PCT/GB2020/052326, mailed/published Feb. 3, 2021.

Primary Examiner — Eduardo C Robert
Assistant Examiner — Holly Joanna Lane
(74) Attorney, Agent, or Firm — LIU & LIU

(57) ABSTRACT

Intervertebral fusion device comprising a superior component, an inferior component, and a core component. The superior component comprises first and second superior parts which are coupled to each other to allow the first and second superior parts to move apart to thereby increase a perimeter of the superior component top side. The inferior component comprises first and second inferior parts which are coupled to each other to allow the first and second inferior parts to move apart to thereby increase a perimeter of the inferior component bottom side. The core component is configured for insertion between the superior and inferior components whereby separation between the superior and inferior components is determined. The core component interengages with each of the superior and inferior components upon insertion. The superior and inferior components are unattached to each other before the core component is inserted between the superior and inferior components. As the core component is progressively inserted between the superior and inferior components, the core component: bears against the first and second superior parts to push the first and second superior parts progressively apart; and bears (Continued)

against the first and second inferior parts to push the first and second inferior parts progressively apart.

22 Claims, 6 Drawing Sheets

(52) U.S. Cl.
CPC .............. *A61F 2002/30515* (2013.01); *A61F 2002/3054* (2013.01)

(56) References Cited

U.S. PATENT DOCUMENTS

| | | | | |
|---|---|---|---|---|
| 11,224,522 | B2* | 1/2022 | To | A61F 2/4455 |
| 11,344,424 | B2* | 5/2022 | Luu | A61F 2/4455 |
| 2003/0074064 | A1* | 4/2003 | Gerbec | A61F 2/447 |
| | | | | 623/16.11 |
| 2004/0254644 | A1* | 12/2004 | Taylor | A61F 2/4425 |
| | | | | 623/17.13 |
| 2006/0122701 | A1* | 6/2006 | Kiester | A61F 2/4611 |
| | | | | 606/90 |
| 2009/0105759 | A1 | 4/2009 | Gimbel et al. | |
| 2013/0325071 | A1 | 12/2013 | Niemiec et al. | |
| 2014/0031938 | A1 | 1/2014 | Lechmann et al. | |
| 2014/0094916 | A1 | 4/2014 | Glerum et al. | |
| 2014/0100662 | A1* | 4/2014 | Patterson | A61F 2/4455 |
| | | | | 623/17.16 |
| 2014/0257486 | A1* | 9/2014 | Alheidt | A61F 2/4455 |
| | | | | 623/17.15 |
| 2016/0213483 | A1 | 7/2016 | To et al. | |
| 2018/0098860 | A1 | 4/2018 | To et al. | |
| 2018/0256357 | A1 | 9/2018 | To et al. | |
| 2019/0269521 | A1 | 9/2019 | Shoshtaev | |
| 2022/0015920 | A1* | 1/2022 | Reah | A61F 2/4455 |
| 2022/0015921 | A1* | 1/2022 | Reah | A61F 2/447 |

* cited by examiner

INTERVERTEBRAL DEVICES

FIELD OF THE INVENTION

The present invention relates to intervertebral devices and more specifically to intervertebral fusion devices.

BACKGROUND ART

Adjacent vertebrae in the spinal column are coupled to each other by a number of ligaments and the intervertebral disc. These anatomic structures hold the adjacent vertebrae together while allowing motion. Among these structures, the intervertebral disc functions as a cushion between the vertebrae whilst allowing for relative movement of the vertebrae. Problems with intervertebral discs arise from one or more of a range of diseases and conditions. A surgical procedure, such as spinal fusion, may be used to address such problems. The goals of spinal fusion include decompressing surrounding neural structures, re-establishing anatomic spinal alignment and stabilising the motion segment by having one vertebral body fuse, or heal, to the adjacent vertebral body. A typical spinal fusion procedure involves partial or full removal of a problematic intervertebral disc and installation of an intervertebral device in the place of the partially or fully removed intervertebral disc in order to maintain the disc space height and alignment and facilitate the fusion of one vertebra to the next.

Known intervertebral devices are of varied form and function. Many known intervertebral devices are configured to provide for adjustment of height and functional spine unit angle to address differing extents of removal of an intervertebral disc, differing anatomy and spinal deformity. Furthermore, ease of assembly, installation, including reduced impaction loads during insertion, and disassembly are design objects for known intervertebral devices aside from issues of manufacturability and cost. Such design objects are often not achieved. Some known intervertebral devices are characterised by their complexity with such complexity being liable to result in compromise on ease of assembly, installation and disassembly, in compromise on long-term reliability, or in risk to the patient, such as from wear of material from the intervertebral device over time and loss of spinal correction.

Relatively few known intervertebral devices provide for expansion of surfaces presented by the intervertebral device to the adjacent vertebrae upon installation of the intervertebral device in the intervertebral space. Having such an expandable intervertebral device, which is of smaller size when contracted, provides for ease of introduction of the contracted intervertebral device into the intervertebral space. Such ease of introduction may be advantageous depending on circumstances, such as when the intervertebral device is being introduced to the intervertebral space laterally of the patient. By way of further example, such ease of introduction may be advantageous when there is less room to avoid critical anatomy, such as major blood vessels and nerves.

The present inventor has become appreciative of shortcomings of known expandable intervertebral devices, such as the shortcomings mentioned above. The present invention has been devised in light of the inventor's appreciation of such shortcomings. It is therefore an object for the present invention to provide an improved expandable intervertebral device and more specifically an improved expandable intervertebral fusion device which provides for expansion of surfaces presented by the intervertebral device to the adjacent vertebrae. It is a further object for the present invention to provide an improved method of installing an expandable intervertebral device in an intervertebral space between first and second adjacent vertebrae and more specifically an improved method of installing an expandable intervertebral fusion device.

STATEMENT OF INVENTION

According to a first aspect of the present invention there is provided an intervertebral fusion device comprising:
  a superior component having a superior component top side and a superior component bottom side, the superior component being configured to be received in an intervertebral space between first and second vertebrae whereby the superior component top side abuts against the first vertebra, the superior component comprising first and second superior parts which are coupled to each other to allow the first and second superior parts to move apart to thereby increase a perimeter of the superior component top side;
  an inferior component having an inferior component top side and an inferior component bottom side, the inferior component being configured to be received in the intervertebral space between the first and second vertebrae whereby the inferior component bottom side abuts against the second vertebra, the superior component bottom side and the inferior component top side opposing each other when the superior and inferior components are received in the intervertebral space, the inferior component comprising first and second inferior parts which are coupled to each other to allow the first and second inferior parts to move apart to thereby increase a perimeter of the inferior component bottom side; and
  a core component configured for insertion between the superior and inferior components whereby separation between the superior and inferior components is determined, the core component inter-engaging with each of the superior and inferior components upon insertion,
  wherein the superior and inferior components are unattached to each other before the core component is inserted between the superior and inferior components, and
  wherein, as the core component is progressively inserted between the superior and inferior components, the core component: bears against the first and second superior parts to push the first and second superior parts progressively apart; and bears against the first and second inferior parts to push the first and second inferior parts progressively apart.

The intervertebral fusion device comprises a superior component, an inferior component and a core component. The superior component has a superior component top side and a superior component bottom side. The superior component is configured to be received in an intervertebral space between first and second vertebrae whereby the superior component top side abuts against the first vertebra. The inferior component has an inferior component top side and an inferior component bottom side. The inferior component is configured to be received in the intervertebral space between the first and second vertebrae whereby the inferior component bottom side abuts against the second vertebra, the superior component bottom side and the inferior component top side opposing each other when the superior and inferior components are received in the intervertebral space. The core component is configured for insertion between the superior and inferior components whereby separation between the superior and inferior components is determined. Separation height and lordotic angle between the superior and inferior components and hence height and lordotic angle of the intervertebral fusion device may thus be determined. The superior and inferior components are unattached to each other before the core component is inserted between the superior and inferior components. Furthermore, the core component inter-engages with each of the superior and inferior components during insertion whereby the superior and inferior components and the core component may be held together in the intervertebral space.

The superior component comprises first and second superior parts which are coupled to each other to allow the first and second superior parts to move apart to thereby increase a perimeter of the superior component top side. Likewise, the inferior component comprises first and second inferior parts which are coupled to each other to allow the first and second inferior parts to move apart to thereby increase a perimeter of the inferior component bottom side. As the core component is progressively inserted between the superior and inferior components, the core component: bears against the first and second superior parts to push the first and second superior parts progressively apart; and bears against the first and second inferior parts to push the first and second inferior parts progressively apart.

The superior and inferior components may be introduced to the intervertebral space when each is in the contracted condition, i.e. when the first and second superior parts are closer together and when the first and second inferior parts are closer together, to provide for ease of their introduction. Insertion of the core component between the thus introduced superior and inferior components puts each of the superior and inferior components in the expanded condition. When the superior component is in the expanded condition, the first and second superior parts have been pushed apart to increase a perimeter of the superior component top side. When the inferior component is in the expanded condition, the first and second inferior parts have been pushed apart to increase a perimeter of the inferior component bottom side. Having a superior component top side of increased perimeter and an inferior component bottom side of increased perimeter may be advantageous. For example, the component top side and the inferior component bottom side may provide for improved support of the adjacent vertebrae, may spread loading over a wider area of the adjacent vertebrae and may provide a greater extent of surface for bony integration into the fusion. The intervertebral fusion device may therefore provide for long-term reliability and reduced risk to the patient.

As described above, the superior and inferior components are unattached to each other before the core component is inserted between the superior and inferior components. The superior component, the inferior component and the core component thus constitute three separate parts. The intervertebral fusion device is therefore modular, unlike many known devices. As described below, a modular device according to the invention confers benefits, such as in respect of ease of ease of assembly, installation and disassembly and perhaps also ease of manufacturability and lower cost.

The core component may comprise a core component superior formation and a core component inferior formation. The core component superior formation may bear against the first and second superior parts to push the first and second superior parts progressively apart. The core component inferior formation may bear against the first and second inferior parts to push the first and second inferior parts progressively apart.

At least one of the core component superior formation and the core component inferior formation may be towards a first side of the core component. The first side of the core component may be introduced first between the superior component and the inferior component upon insertion of the core component between the superior component and the inferior component.

The first superior part may define a first superior part formation and the second superior part may define a second superior part formation. The core component superior formation may cooperate with, and more specifically, may bear against the first and second superior part formations to push the first and second superior parts apart during insertion of the core component.

The core component superior formation may bear against the first and second superior part formations simultaneously to push the first and second superior parts apart during insertion of the core component.

The first and second superior part formations may oppose and be spaced apart from each other. Furthermore, a size of a gap between the first and second superior part formations may change in a direction of insertion of the core component between the superior and inferior components. The gap may decrease, and more specifically may decrease progressively, in the direction of insertion of the core component. The gap may be at its widest towards a side of the superior component that first receives the core component upon insertion of the core component. The core component superior formation may bear against the first and second superior part formations during insertion of the core component, with the decreasing gap between the first and second superior part formations providing for progressive pushing apart of the first and second superior parts.

As described further below, cooperation of the core component superior formation with the first and second superior part formations may provide for inter-engagement of the core component and the superior component. More specifically, the core component superior formation and the first and second superior part formations may provide for inter-engagement of the core component with the superior component during insertion of the core component. The component superior formation and the first and second superior part formations may therefore be relatively disposed and configured for movement, and more specifically sliding, of the component superior formation relative to the first and second superior part formations.

The inferior component may be similarly structured to the superior component. The first inferior part may thus define a first inferior part formation and the second inferior part may define a second inferior part formation. The core component inferior formation may cooperate with, and more specifically, may bear against the first and inferior part formations to push the first and second inferior parts apart during insertion of the core component.

The core component inferior formation may bear against the first and second inferior part formations simultaneously to push the first and second inferior parts apart during insertion of the core component.

The first and second inferior part formations may oppose and be spaced apart from each other. Furthermore, a size of a gap between the first and second inferior part formations may change in a direction of insertion of the core component between the superior and inferior components. The gap may decrease, and more specifically may decrease progressively, in the direction of insertion of the core component. The gap may be at its widest towards a side of the inferior component that first receives the core component upon insertion of the core component. The core component inferior formation may bear against the first and second inferior part formations during insertion of the core component, with the decreasing gap between the first and second inferior part formations providing for pushing apart of the first and second inferior parts.

As described further below, cooperation of the core component inferior formation with the first and second inferior part formations may provide for inter-engagement of the core component and the inferior component. More specifically, the core component inferior formation and the first and second inferior part formations may provide for inter-engagement of the core component with the inferior component during insertion of the core component. The component inferior formation and the first and second inferior part formations may therefore be relatively disposed and configured for movement, and more specifically sliding, of the component inferior formation relative to the first and second inferior part formations.

Each of the superior component and the inferior component may be similarly structured to allow for their respective parts to move apart to thereby increase the respective perimeter. Each of the superior component and the inferior component may comprise an expandable structure which mechanically couples the first and second parts, i.e. the first and second superior parts in the superior component and the first and second inferior parts in the inferior component.

The expandable structure may be biased to draw the respective first and second parts together whereby the superior component or the inferior component is biased towards the contracted condition. The expandable structure may be biased by way of at least one of material of the expandable structure and form of the expandable structure.

The expandable structure may comprise at least one sprung member which couples the respective first and second parts. The sprung member may have the form of a loop. More specifically, the expandable structure may comprise first and second sprung members which each couple the respective first and second parts. The first and second sprung members may be spaced apart along a direction of insertion of the core component between the superior and inferior components.

The expandable structure may lie in a plane substantially parallel to a plane in which the respective first and second part formations lie. The expandable structure may define at least a part of a vertebral facing surface of the respective one of the superior and inferior components.

The expandable structure may be integrally formed with the respective first and second parts. The superior component, as described above, may therefore be integrally formed and the inferior component, as described above, may therefore be integrally formed.

As described above, the core component comprises a core component superior formation and a core component inferior formation.

The core component superior formation may protrude from an upper side of the core component and the core component inferior formation may protrude from a lower side of the core component.

Each of the core component superior formation and the core component inferior formation may be located at a side of the core component and more specifically at the side of the core component which is received first between the superior and inferior components. Each of the core component superior formation and the core component inferior formation may extend part way along the core component and more specifically no more than 50% and preferably 10% along the core component.

Each of the core component superior formation and the core component inferior formation may define first and second keyways that each extend along the core component, the first and second keyways facing in opposite directions. Directions of facing of the first and second keyways may be substantially orthogonal to a direction of insertion of the core component between the superior and inferior components.

The first and second keyways of the core component superior formation may be shaped to slidably receive the first and second superior part formations respectively to thereby provide for inter-engagement of core component and superior component.

Slidable reception of the first and second superior part formations in the first and second keyways may present resistance to separation of core component and superior component in a direction of separation of the superior and inferior components. The first and second superior part formations may be slidably received in the first and second keyways when the first and second superior parts are being pushed apart by the core component superior formation, as described above.

The first and second keyways of the core component inferior formation may be shaped to slidably receive the first and second inferior part formations respectively to thereby provide for inter-engagement of core component and inferior component. Slidable reception of the first and second inferior part formations in the first and second keyways may present resistance to separation of core component and inferior component in a direction of separation of the superior and inferior components. The first and second inferior part formations may be slidably received in the first and second keyways when the first and second inferior parts are being pushed apart by the core component inferior formation, as described above.

The core component may further comprise a superior inter-engaging formation and an inferior inter-engaging formation. The superior inter-engaging formation and the inferior inter-engaging formation may protrude from a respective one of the upper and lower sides of the core component.

The superior inter-engaging formation may extend along the core component and may be generally in line with the core component superior formation. Similarly, the inferior inter-engaging formation may extend along the core component and may be generally in line with the core component inferior formation. There may be a first gap between the superior inter-engaging formation and the core component superior formation and a second gap between the inferior inter-engaging formation and the core component inferior formation.

Each of the superior inter-engaging formation and the inferior inter-engaging formation may extend a substantial way along the core component. More specifically, each of the superior inter-engaging formation and the inferior inter-engaging formation may extend to a side of the core component opposite the side where the core component superior formation and the core component inferior formation are located.

Each of the superior inter-engaging formation and the inferior inter-engaging formation may define first and second keyways with each of the first and second keyways extending along the core component, and the first and second keyways facing in generally opposite directions.

Directions of facing of the first and second keyways may be generally orthogonal to a direction of insertion of the core component between the superior and inferior components.

The first and second keyways of the superior inter-engaging formation may be in registration with the first and second keyways of the core component superior formation and the first and second keyways of the inferior inter-engaging formation may be in registration with the first and second keyways of the core component inferior formation.

The first and second keyways of each of the superior inter-engaging formation and the inferior inter-engaging formation may be closer to each other at a first end of the inter-engaging formation closer to the respective one of the core component superior formation and the core component inferior formation than a second, opposite end of the inter-engaging formation. Furthermore, spacing between the first and second keyways may increase progressively from the first end to the second end. The first and second keys may therefore be inclined to each other.

As described above, the size of the gap between each of the first and second superior part formations and the first and second inferior part formations may decrease progressively in a direction of insertion of the core component between the superior and inferior components. The profile of the gap may substantially correspond to the profile defined by the inclined first and second keyways. The superior/inferior part formations may therefore be properly received along their length in the first and second keyways.

The gap between each of the first and second superior part formations and the first and second inferior part formations may be at its narrowest towards a side of the superior/inferior component opposite the side first receiving the core component.

Closer to the side of the superior component opposite the side first receiving the core component, each of the first and second superior part formations defines a slot with the thus defined slots being in registration. Each slot may extend in a direction of separation of the first and second superior parts. The gap may therefore increase markedly at the slots. Each slot may be shaped to receive a respective one of opposite sides of the core component superior formation. As the core component is inserted between the superior and inferior components, the core component superior formation may bear against the first and second superior part formations and push them apart. When the core component superior formation reaches the slots, the first and second superior part formations may be pulled together under the spring bias described above whereby the opposite sides of the core component superior formation are received in the slots and the first and second superior part formations are received in the first and second keyways of the superior inter-engaging formation. The core component may thus inter-engage with the superior component when the core component is properly received between the superior and inferior components.

Likewise, closer to the side of the inferior component opposite the side first receiving the core component, each of the first and second inferior part formations defines a slot with the thus defined slots being in registration. Each slot may extend in a direction of separation of the first and second inferior parts. The gap may therefore increase markedly at the slots. Each slot may be shaped to receive a respective one of opposite sides of the core component inferior formation. As the core component is inserted between the superior and inferior components, the core component inferior formation may bear against the first and second inferior part formations and push them apart. When the core component inferior formation reaches the slots, the first and second inferior part formations may be pulled together under the spring bias described above whereby the opposite sides of the core component inferior formation are received in the slots and the first and second inferior part formations are received in the first and second keyways of the inferior inter-engaging formation. The core component may thus inter-engage with the inferior component when the core component is properly received between the superior and inferior components.

An upper side and a lower side of the core component may be inclined to each other. The core component may therefore have the form of a wedge. Furthermore, the upper side and a lower side may not meet at an acute angle whereby the core component has the form of a frustum of a wedge. An inclination of the inferior and superior components relative to each other may thus be determined by way of the core component further to a separation between the inferior and superior components. Extent of inclination of the inferior and superior components may be determined by selection from a plurality of core components having upper and lower sides of different inclinations. Such selection may be combined with selection from a plurality of core components having different heights.

The core component may be inserted between the inferior and superior components such that the inclination of the wedge is in a direction substantially orthogonal to the direction of insertion of the core component. The intervertebral fusion device may therefore be a lateral intervertebral fusion device.

The lateral intervertebral fusion device may have dimensions appropriate for use as such. Each of the superior and inferior components may have a range of length by width from 40 mm by 14 mm to 65 mm by 26 mm. Each of the superior and inferior components may have a range of height from 1 mm to 4 mm. The core component may have a range of length by width from 40 mm by 14 mm to 65 mm by 22 mm. The core component may have a range of height from 4 mm to 12 mm.

In another application of the invention, the intervertebral fusion device may be an anterior lumbar interbody fusion (ALIF) device. In view of the different direction of installation of the ALIF device, the intervertebral fusion device may be appropriately configured. Considering this further, the core component may be inserted between the superior and inferior components in a direction of the taper defined by the core component. Cooperating profiles of the core component and the superior and inferior components may therefore extend in the anterior-posterior direction instead of in the lateral direction. Nevertheless, insertion of the core component between the superior and inferior components pushes the first superior part and the second superior part apart to put the superior component in the expanded condition and pushes the first inferior part and the second inferior part apart to put the inferior component in the expanded condition.

The ALIF device may have dimensions appropriate for use as such. Each of the superior and inferior components may have a range of length by width from 25 mm by 25 mm to 40 mm by 35 mm. Each of the superior and inferior components may have a range of height from 1 mm to 4 mm. The core component may have a range of length by width from 25 mm by 25 mm to 35 mm by 35 mm. The core component may have a range of height from 4 mm to 12 mm.

In another application of the invention, the intervertebral fusion device may be an oblique lumbar interbody fusion (OLIF) device. In view of the different direction of installation of the OLIF device, the intervertebral fusion device may be appropriately configured. Considering this further, the core component may be inserted between the superior and inferior components in a direction oblique to the direction of the taper defined by the core component. Cooperating profiles of the core component and the superior and inferior components may therefore extend in the oblique direction instead of in the lateral direction. Nevertheless, insertion of the core component between the superior and inferior components pushes the first superior part and the second superior part apart to put the superior component in the expanded condition and pushes the first inferior part and the second inferior part apart to put the inferior component in the expanded condition.

The OLIF device may have dimensions appropriate for use as such. Each of the superior and inferior components may have a range of length by width from 25 mm by 16 mm to 45 mm by 25 mm. Each of the superior and inferior components may have a range of height from 1 mm to 4 mm. The core component may have a range of length by width from 25 mm by 16 mm to 45 mm by 20 mm. The core component may have a range of height from 4 mm to 12 mm.

Each of the superior and inferior components may have the form of a plate, albeit a plate having structures thereon that provide for expansion and contraction and inter-engagement with the core component as described above, whereby each is thin relative to its length and width. At least one of the superior component top side and the inferior component bottom side may be shaped in the coronal or sagittal planes, for example domed, to enhance fit and contact with adjacent vertebrae.

At least one of the superior and inferior components and the core component may have at least one aperture extending therethrough in a direction of separation of the inferior and superior components. Such at least one aperture may provide for distribution of bone graft material and, more specifically, where the at least one aperture is in the superior or inferior component, the at least one aperture may allow passage for bone graft material to engage with the adjacent vertebra.

The core component, the superior component and the inferior component may be formed by the like of casting, moulding or printing. Alternatively, the core component, the superior component and the inferior component may be formed by the like of machining or stamping.

At least one of the superior component, the core component and the inferior component may be formed from a metal, such as titanium, or a metal alloy, such as stainless steel, Ti6Al4V, CoCr or nitinol. Nitinol may be useful in respect of cooperating parts of the superior component, the core component and the inferior component. At least one of the superior component, the core component and the inferior component may be formed from a plastics material and more specifically a thermoplastic polymer, such as PEEK, carbon reinforced PEEK or UHMWPE (Ultra High Molecular Weight PolyEthylene). In forms of the invention, the core component may be formed by 3D printing whereby the core component has the form of a 3D lattice. The aforementioned materials may be used to form the core component by way of 3D printing.

According to a second aspect of the present invention there is provided a method of installing an intervertebral fusion device in an intervertebral space between first and second adjacent vertebrae, the intervertebral fusion device comprising a superior component having a superior component top side and a superior component bottom side, an inferior component having an inferior component top side and an inferior component bottom side, and a core component, the method comprising:

receiving the superior component in the intervertebral space whereby the superior component top side abuts against the first vertebra, wherein the superior component comprises first and second superior parts which are coupled to each other to allow the first and second superior parts to move apart to thereby increase a perimeter of the superior component top side;

receiving the inferior component in the intervertebral space whereby the inferior component bottom side abuts against the second vertebra and the superior component bottom side and the inferior component top side oppose each other when the superior and inferior components are received in the intervertebral space, wherein the inferior component comprises first and second inferior parts which are coupled to each other to allow the first and second inferior parts to move apart to thereby increase a perimeter of the inferior component bottom side; and inserting the core component between the superior and inferior components whereby separation between the superior and inferior components is determined, the core component inter-engaging with each of the superior and inferior components upon insertion, wherein the superior and inferior components are unattached to each other before the core component is inserted between the superior and inferior components, and wherein, as the core component is progressively inserted between the superior and inferior components, the core component: bears against the first and second superior parts to push the first and second superior parts progressively apart; and bears against the first and second inferior parts to push the first and second inferior parts progressively apart.

Embodiments of the second aspect of the present invention may comprise one or more features of the first aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1A:
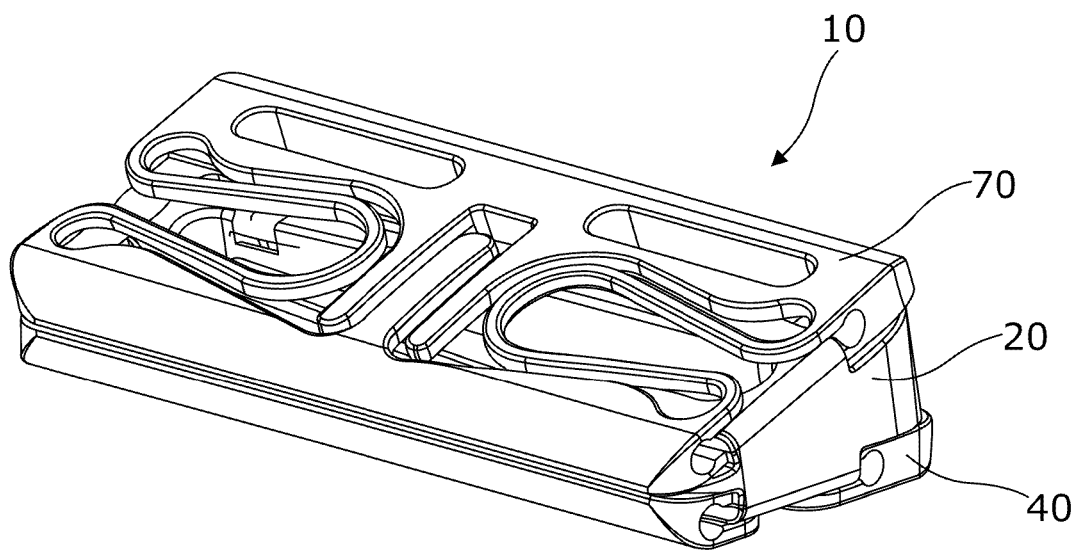
FIG. 1A is a perspective view of a first embodiment of intervertebral fusion device when fully assembled.

A first embodiment of intervertebral fusion device 10 is shown in FIG. 1A when fully assembled and installed in an intervertebral space of a patient. The first embodiment of intervertebral fusion device 10 is a lateral intervertebral fusion device. A lateral intervertebral fusion device is introduced to the intervertebral space laterally of the patient. The lateral intervertebral fusion device 10 comprises a core component 20, an inferior component 40 and a superior component 70.

Figure 1B:
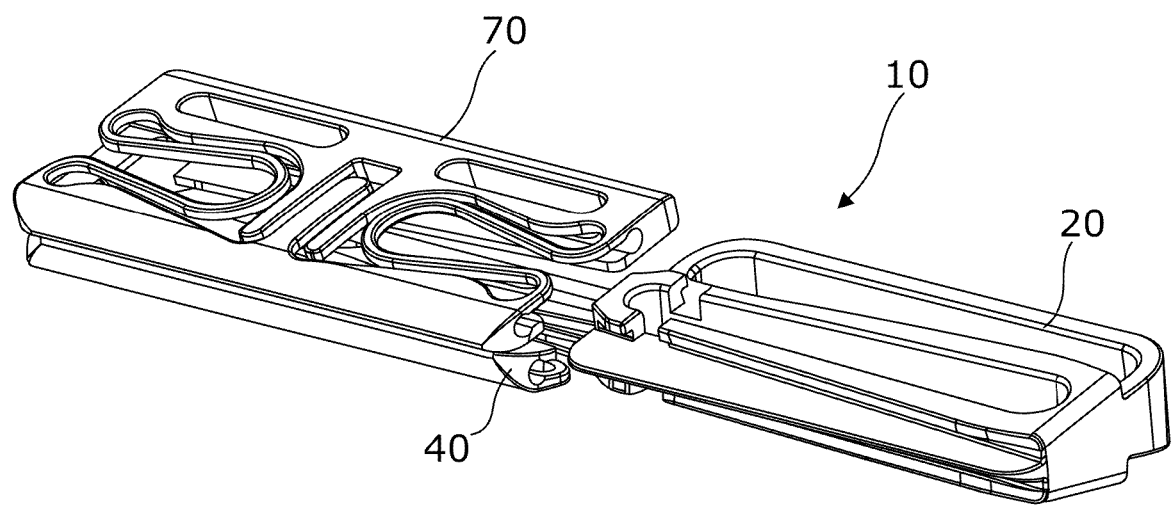
FIG. 1B is a perspective view of the first embodiment before the core component is inserted between the superior and inferior components.

Each of the superior component 70 and the inferior component 40 is generally of the form of a plate, albeit a plate having structures thereon and apertures through the centre thereof. The core component 20 has the form of a frustum of a wedge. The lateral intervertebral fusion device 10 is assembled by putting the superior and inferior components 70, 40 into the intervertebral space and such that they have the disposition shown in FIG. 1B. The core component 20 is introduced to the patient's body and positioned relative to the superior and inferior components 70, 40 as shown in FIG. 1B. The core component 20 is then inserted between the superior and inferior components 70, 40 and such that the core component slidably inter-engages with the superior and inferior components, as is described further below. The superior and inferior components 70, 40 are held to the core component 20 by inter-engagement, with the core component determining the height of the lateral intervertebral fusion device 10 and the angle of the superior and inferior components relative to each other. Use of core components 20 of different thicknesses and/or different extents of tapering wedge and with the same superior component 70 and inferior component 40 provides for different heights and angles of lateral intervertebral fusion device 10.

Considering assembly of the lateral intervertebral fusion device 10 further the superior component 70 and the inferior component 40 are placed in the intervertebral space, as described above, with the disposition shown generally in FIG. 1B. The core component 20 is positioned relative to the superior and inferior components 70, 40 such that one of the tapering sides of the core component is foremost, as also shown in FIG. 1B, before the core component is progressively inserted in the lateral direction between the superior and inferior components until fully received between the superior and inferior components, as shown in FIG. 1A. When the lateral intervertebral fusion device 10 is assembled, the superior component top side abuts against a first vertebra defining the intervertebral space in part and the inferior component bottom side abuts against a second vertebra defining the intervertebral space in part. As can be seen from comparison of FIGS. 1A and 1B, each of the superior and inferior components 70, 40 is of greater extent in a direction orthogonal to the lateral direction in FIG. 1A than in FIG. 1B, i.e. each of the superior and inferior components is of greater extent in the posterior-anterior direction of the patient in FIG. 1A than in FIG. 1B.

Each of the superior and inferior components 70, 40 is therefore in a contracted condition in FIG. 1B and an expanded condition in FIG. 1A whereby a perimeter of each of the superior and inferior components increases when changing from the contracted condition to the expanded condition. When the superior and inferior components 70, 40 are in the contracted condition of FIG. 1B, they are narrower and therefore readily introduced to the intervertebral space. Insertion of the core component 20 between the thus introduced superior and inferior components 70, 40, as described above, changes each of the superior and inferior components from the contracted condition to the expanded condition. Cooperation of the core component 20 with the superior and inferior components 70, 40 for change from the contracted condition to the expanded condition upon insertion of the core component is described further below.

When the superior component 70 is in the expanded condition a perimeter of the superior component top side is increased and when the inferior component 40 is in the expanded condition a perimeter of the inferior component bottom side is increased. Having a superior component top side of increased perimeter and an inferior component bottom side of increased perimeter is advantageous. For example, the component top side and the inferior component bottom side provide for improved support of the adjacent vertebrae, spread loading over a wider area of the adjacent vertebrae and provide a greater extent of surface for bone graft formation.

Figure 2A:
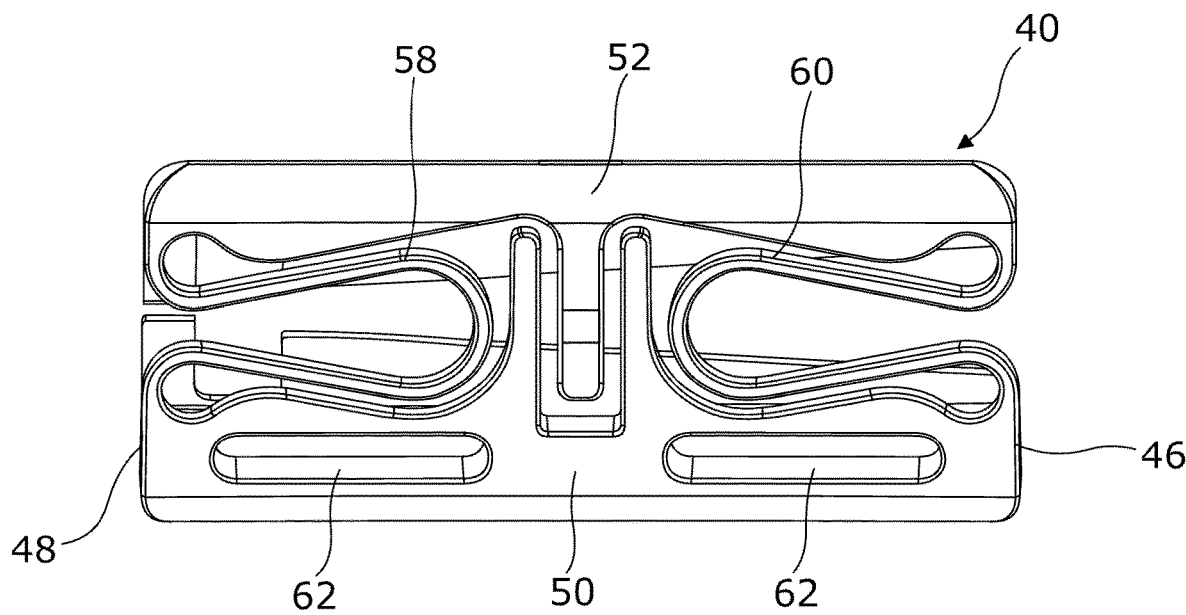
FIG. 2A is a plan view of the inferior component of the first embodiment.
Figure 2B:
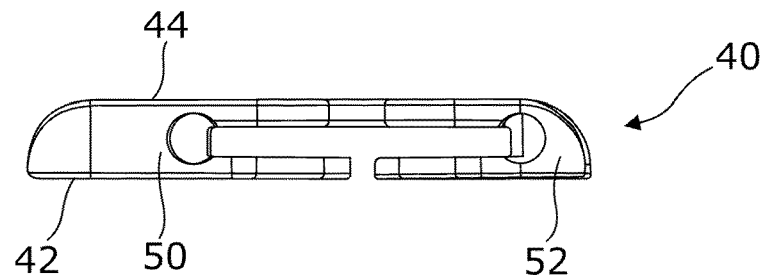
FIG. 2B is an end view of the inferior component of the first embodiment.
Figure 2C:
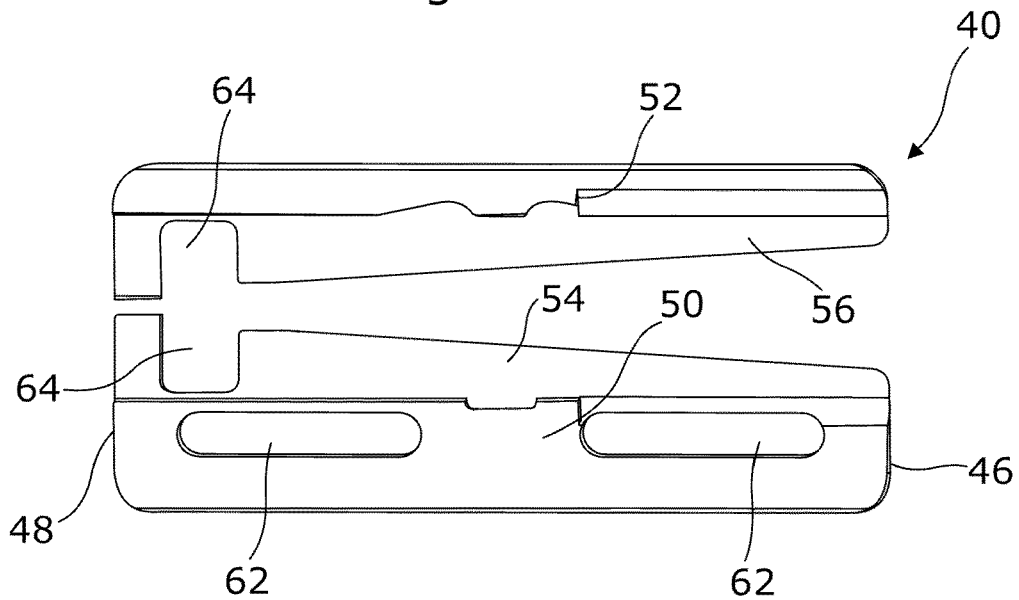
FIG. 2C is a section through the inferior component shown in FIG. 2A.

The superior and inferior components 70, 40 will now be described further with reference to FIGS. 2A to 2C. The superior and inferior components 70, 40 are a mirror image of each other as described further below with reference to FIG. 2D and, therefore, FIGS. 2A to 2C show the inferior component 40 as representative of the form and function of the superior component 70. FIG. 2A is a plan view of the inferior component 40 looking towards the inferior component bottom side, FIG. 2B is an end view of the inferior component, and FIG. 2C is a section in the lateral direction through the inferior component as shown in FIG. 2A.

The inferior component 40 is integrally formed from a metal or a plastics material. The inferior component 40 has an inferior component bottom side 44, an inferior component top side 42, a first lateral side 46 and a second lateral side 48. Furthermore, the inferior component 40 has a first inferior part 50 and a second inferior part 52 which are coupled to each other to allow the first and second inferior parts to move apart and together and thereby change between the contracted and expanded conditions described above.

The first inferior part 50 defines a first inferior part formation 54 and the second inferior part 52 defines a second inferior part formation 56. The first and second inferior part formations 54, 56 oppose and are spaced apart from each other. Furthermore, a gap between the first and second inferior part formations 54, 56 decreases progressively in the direction of insertion of the core component 20 between the superior and inferior components. The gap is at its widest at the first lateral side 46 at which the core component is first received upon insertion of the core component. As described further below, the core component 20 bears against the first and inferior part formations 54, 56 to push the first and second inferior parts 50, 52 apart during insertion of the core component. Considering this further, the core component 20 bears against the first and second inferior part formations 54, 56 to progressively push apart the first and second inferior parts as the core component moves on account of the decreasing gap between the first and second inferior part formations.

The inferior component 40 further comprises an expandable structure which mechanically couples the first and second inferior parts 50, 52. The expandable structure defines part of the vertebral facing surface defined by the inferior component bottom side 44. The expandable structure comprises a first sprung member 58 and a second sprung member 60 which each mechanically couple the first and second parts to each other. The first and second sprung members 58, 60 are spaced apart along a direction of insertion of the core component between the superior and inferior components. Each of the first and second sprung members 58, 60 has the form of a loop which lies in a plane substantially parallel to a plane in which the first and second inferior part formations 54, 56 lie. Each of the first and second sprung members 58, 60 is biased by way of the material of which it is formed and its shape to draw the first and second inferior parts 50, 52 together whereby the inferior component 40 is biased towards the contracted condition. Further to this, the inferior component 40 comprises two apertures 62 extending therethrough between the inferior component bottom side 44 and the inferior component top side 42. The apertures 62 provide for distribution of bone graft material and, more specifically, for passage for bone graft material so it can engage with the adjacent vertebra.

As described above, the tapering gap between the first and second inferior part formations 54, 56 is at its widest at the first lateral side 46. The gap is therefore at its narrowest towards the second lateral side 48. Beyond the end of the taper and closer to the second lateral side 48, each of the first and second inferior part formations 54, 56 defines a slot 64 with the thus defined slots in registration. Each slot 64 extends in a direction of separation of the first and second inferior parts 50, 52. The gap therefore increases markedly at the slots. As described further below, each slot 64 is shaped to receive a respective one of opposite sides of a core component inferior formation of the core component 20.

Figure 2D:
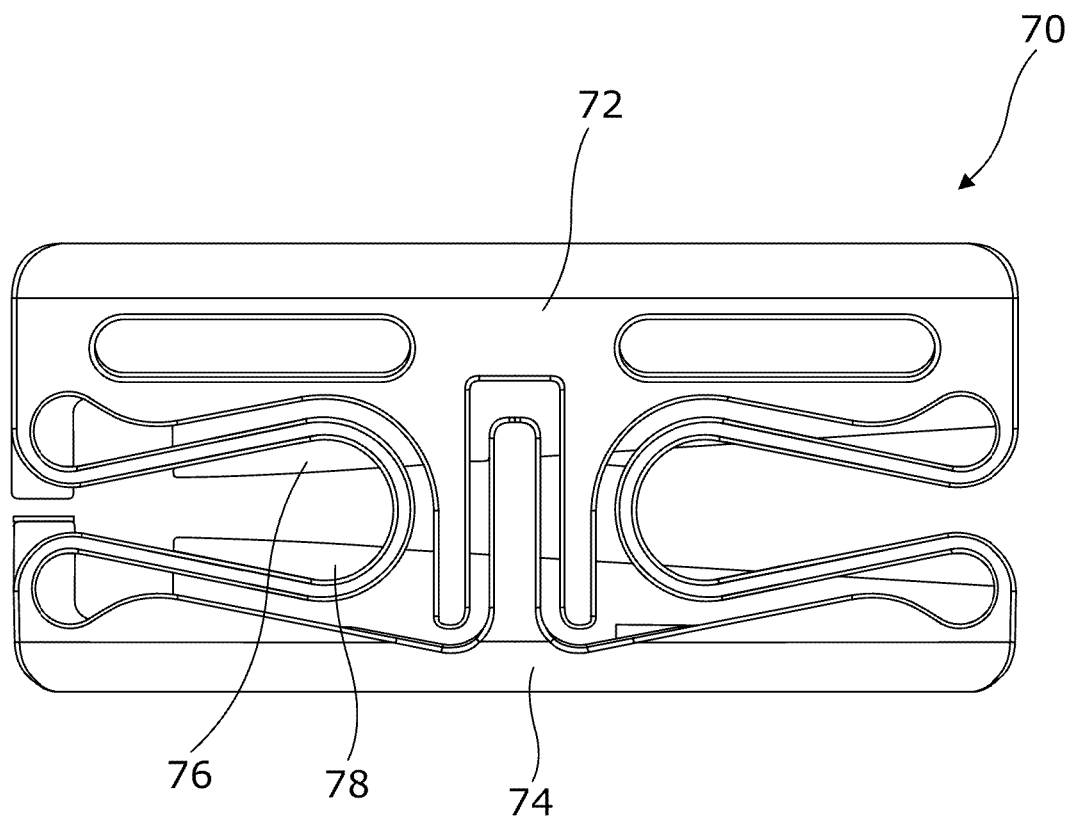
FIG. 2D is a plan view of the superior component of the first embodiment.

The superior component 70 is structured as described above with reference to FIGS. 2A to 2C except as will now be described with reference to FIG. 2D. FIG. 2D is a plan view of the superior component 70 viewed from the superior component top side which abuts against the adjacent vertebra. As can be seen from comparison of the plan view of the inferior component 40 in FIG. 2A and the plan view of the superior component 70 in FIG. 2D, the inferior and superior components 40, 70 are mirror images of each other about a plane bisecting the inferior and superior components in the lateral direction, i.e. in the direction of insertion of the core component between the inferior and superior components. Otherwise, the structure and features of the inferior and superior components 40, 70 are the same as described above with reference to FIGS. 2A to 2C but with the parts identified above in respect of the inferior component 40 identified in respect of the superior component 70. Therefore, and by way of example, the superior component has first 72 and second 74 superior parts instead of first and second inferior parts 50, 52, and first 76 and second 78 superior part formations instead of first and second inferior part formations 54, 56.

Figure 3A:
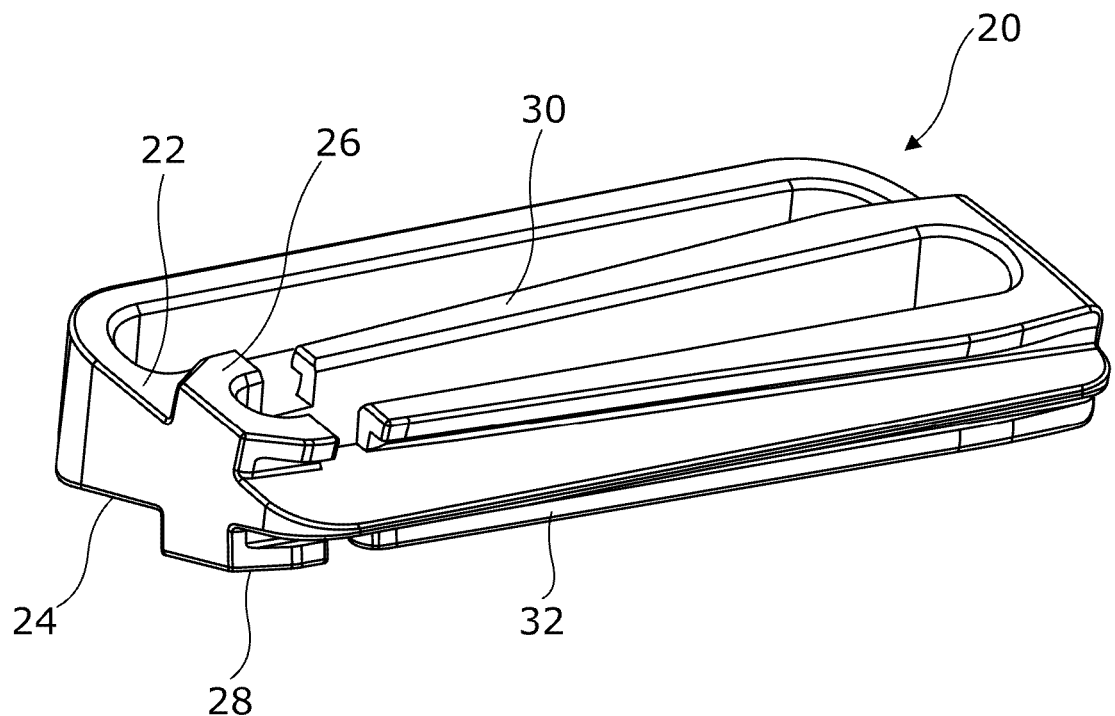
FIG. 3A is a perspective view of the core component of the first embodiment.
Figure 3B:
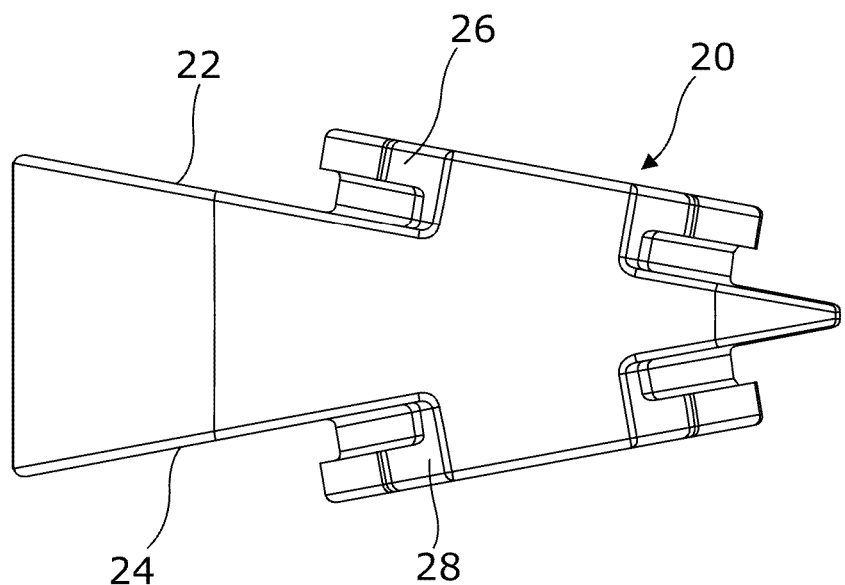
FIG. 3B is an end view of the core component of the first embodiment.

The core component 20 will now be described with reference to FIGS. 3A and 3B. FIG. 3A is a perspective view of the core component 20 and FIG. 3B is an end view of the core component. The core component 20 is integrally formed from a metal or a plastics material. As can be seen from FIGS. 3A and 3B, an upper side 22 and a lower side 24 of the core component are inclined to each other whereby the core component has the form of a frustum of a wedge. An inclination of the inferior and superior components 40, 70 relative to each other is thus determined by way of the core component further to a separation between the inferior and superior components. In view of the intervertebral fusion device being a lateral intervertebral fusion device, the core component 20 is inserted between the inferior and superior components 40, 70 such that the inclination of the wedge is in a direction substantially orthogonal to the direction of insertion of the core component.

The core component 20 comprises a core component superior formation 26, a core component inferior formation 28, a superior inter-engaging formation 30 and an inferior inter-engaging formation 32. The core component superior formation 26 and the superior inter-engaging formation 30 protrude from the upper side 22 of the core component and the core component inferior formation 28 and the inferior inter-engaging formation 32 protrude from the lower side 24 of the core component. Each of the core component superior formation 26 and the core component inferior formation 28 is located at a side of the core component 20 which is received first between the superior and inferior components 70, 40 and extends 10% along the length of the core component, i.e. against the direction of insertion. There is then a gap before each of the superior inter-engaging formation 30 and the inferior inter-engaging formation 32 starts with each of the superior and inferior inter-engaging formations extending to a side of the core component opposite the side where the core component superior formation and the core component inferior formation are located. The superior inter-engaging formation 30 extends along the core component generally in line with the core component superior formation 26. Similarly, the inferior inter-engaging formation 32 extends along the core component generally in line with the core component inferior formation 28.

Each of the core component superior formation 26 and the core component inferior formation 28 defines first and second keyways that each extend along the length of core component. The first and second keyways face in opposite directions such that directions of facing of the first and second keyways are substantially orthogonal to a direction of insertion of the core component between the superior and inferior components. Each of the superior inter-engaging formation 30 and the inferior inter-engaging formation 32 defines first and second keyways that each extend along the length of the core component. The first and second keyways of the inter-engaging formations 30, 32 face in generally opposite directions such that directions of facing of the first and second keyways are generally orthogonal to a direction of insertion of the core component between the superior and inferior components.

The first and second keyways of the superior inter-engaging formation 30 are in registration with the first and second keyways of the core component superior formation 26. Also, the first and second keyways of the inferior inter-engaging formation 32 are in registration with the first and second keyways of the core component inferior formation 28. The first and second keyways of each of the superior inter-engaging formation 30 and the inferior inter-engaging formation 32 are closer to each other at a first end of the inter-engaging formation closer to the respective one of the core component superior formation and the core component inferior formation than a second, opposite end of the inter-engaging formation. Furthermore, spacing between the first and second keyways increases progressively from the first end to the second end whereby the first and second keys define a taper. The taper defined by the first and second keyways of each inter-engaging formation 30, 32 corresponds to the taper defined respectively by the gap between the first and second superior part formations 76, 78 and by the gap between the first and second inferior part formations 54, 56.

The first and second keyways of the core component superior formation 26 are shaped to slidably receive the first and second superior part formations 76, 78 respectively upon initial insertion of the core component to thereby provide for inter-engagement of core component and superior component. Slidable reception of the first and second superior part formations 76, 78 in the first and second keyways presents resistance to movement apart of core component 20 and superior component 70 in a direction of separation of the superior and inferior components. Likewise, the first and second keyways of the core component inferior formation 28 are shaped to slidably receive the first and second inferior part formations 54, 56 respectively upon initial insertion of the core component to thereby provide for inter-engagement of core component 20 and inferior component 40. Slidable reception of the first and second inferior part formations 54, 56 in the first and second keyways presents resistance to movement apart of core component 20 and inferior component 40 in a direction of separation of the superior and inferior components.

Upon further insertion of the core component 20, the core component superior formation 26 bears against the first and second superior part formations 76, 78 and slides along them to push the first and second superior parts 72, 74 progressively apart. Likewise, the core component inferior formation 28 simultaneously bears against the first and second inferior part formations 54, 56 and slides along them to push the first and second inferior parts 50, 52 progressively apart.

When the core component 20 is nearing full insertion between the superior and inferior components 70, 40, the core component inferior formation 28 reaches the opposed slots 64 in the inferior component 40 and simultaneously the core component superior formation 26 reaches the opposed slots in the superior component 70. Oppositely directed sides of the core component inferior formation 28 are then received in the opposed slots 64 in the inferior component 40 and simultaneously oppositely directed sides of the core component superior formation 26 are received in the opposed slots in the superior component 70. The inferior and superior formations 28, 26 are pulled into their respective opposed slots by the spring bias exerted by the expandable structures described above whereby the first and second superior parts 72, 74 are pulled together and the first and second inferior parts 50, 52 are pulled together. Inter-engagement of the core component inferior formation 28 with opposed slots 64 and inter-engagement of the core component superior formation 26 with opposed slots presents resistance to ejection of the core component 20 from between the superior and inferior components 70, 40. Furthermore, the first and second superior part formations 76, 78 are received in the first and second keyways defined by the superior inter-engaging formation 30 and the first and second inferior part formations 54, 56 are received in the first and second keyways defined by the inferior inter-engaging formation 32. The core component 20 thus inter-engages with each of the superior and inferior components 70, 40 to present resistance to movement apart of core component, superior component and inferior component in a direction of separation of superior and inferior components.

Each of the superior and inferior components 70, 40 of the lateral intervertebral fusion device 10 has a range of length by width from 40 mm by 14 mm to 65 mm by 26 mm. Each of the superior and inferior components has a range of height from 1 mm to 4 mm. The core component 20 has a range of length by width from 40 mm by 14 mm to 65 mm by 22 mm. The core component has a range of height from 4 mm to 12 mm.

Figure 4A:
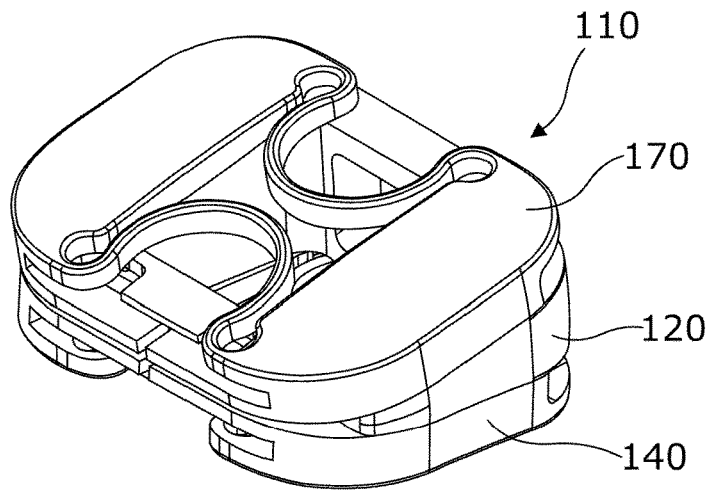
FIG. 4A is a perspective view of a second embodiment of intervertebral fusion device when fully assembled.

A perspective view of a second embodiment of intervertebral fusion device 110 is shown in FIG. 4A when fully assembled and installed in an intervertebral space of a patient. The second embodiment of intervertebral fusion device 110 is an anterior lumbar intervertebral fusion (ALIF) device. An ALIF device is introduced to the intervertebral space from the anterior direction of the patient. The ALIF device 110 comprises a core component 120, an inferior component 140 and a superior component 170. The form and function of the ALIF device 110 are the same as the form and function of the lateral intervertebral fusion device 10 described above with exception of configuration for use in an anterior lumbar procedure instead of a lateral procedure. Orientation of features of the ALIF device 110 therefore differs from orientation of features of the lateral intervertebral fusion device 10 to reflect this change in direction of procedure.

Figure 4B:
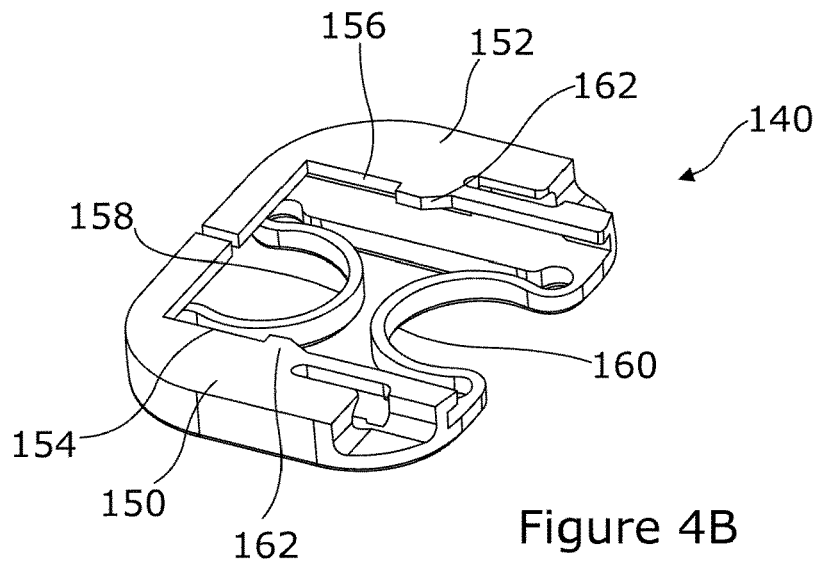
FIG. 4B is a perspective view of the inferior component of the second embodiment.

A perspective view of the inferior component 140 of the ALIF device 110 is shown in FIG. 4B. The superior component 170 of the ALIF device 110 is identical to the inferior component 140 of the ALIF device 110 whereby there is no mirroring of superior and inferior components, as described above with reference to the lateral intervertebral fusion device 10. Considering the inferior component 140 further, the inferior component 140 comprises a first inferior component part 150 and a second inferior component part 152 which move apart and together to provide for expansion and contraction of the inferior component, as described above with reference to the lateral intervertebral fusion device 10. Likewise, the first inferior part 150 defines a first inferior part formation 154 and the second inferior part 152 defines a second inferior part formation 156. The first and second inferior part formations 154, 156 are spaced apart from and oppose each other. Although the first and second inferior part formations 154, 156 of the present embodiment are of different form to the first and second inferior part formations 54, 56 of the previous embodiment, they still cooperate with the core component to force the first and second inferior parts 150, 152 apart upon insertion of the core component 120.

The inferior component 140 also comprises an expandable structure. The expandable structure comprises a first sprung member 158 and a second sprung member 160 which each mechanically couple the first and second parts to each other. The first and second sprung members 158, 160 are spaced apart along a direction of insertion of the core component between the superior and inferior components. Each of the first and second sprung members 158, 160 has the form of a loop which lies in a plane substantially parallel to a plane in which the first and second inferior part formations 154, 156 lie. Each of the first and second sprung members 158, 160 is biased by way of the material of which it is formed and its shape to draw the first and second inferior parts 150, 152 together whereby the inferior component 140 is biased towards the contracted condition. The expandable structure of the present embodiment is therefore of corresponding form and function to the expandable structure of the previous embodiment.

Figure 4C:
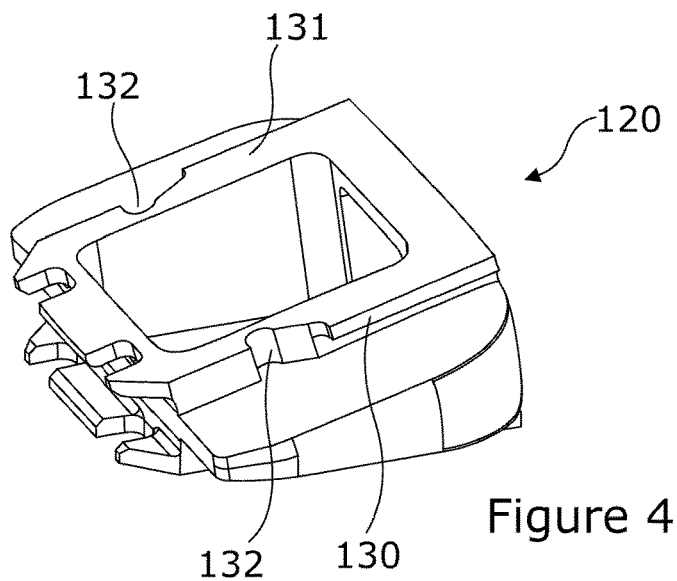
FIG. 4C is a perspective view of the core component of the second embodiment.

A perspective view of the core component 120 of the ALIF device 110 is shown in FIG. 4C. In common with the previous embodiment, the core component 120 of the present embodiment is also wedge shaped but with profiles which cooperate with each of the superior component 170 and the inferior component 140 extending in the direction of the taper of the wedge instead of orthogonal to the direction of taper of the wedge. Considering the profiles further, the core component 120 comprise a first superior inter-engaging formation 130 and a second superior inter-engaging formation 131 which are towards the upper side of the core component and spaced apart from each other. Each of the first and second superior inter-engaging formations 130, 131 defines a keyway for receiving and slidably inter-engaging with a respective one of first and second superior part formations. The keyways defined by the first and second superior inter-engaging formations 130, 131 therefore face in opposite directions with each keyway extending in a direction of taper of the core component. As can be seen from FIG. 4C, each of the first and second superior inter-engaging formations 130, 131 defines a slot 132. Each of the first and second superior part formations defines a protrusion 162. When the core component 120 is fully inserted between the superior and inferior components 140, 170, each protrusion 162 is received in a respective slot 132 to thereby hold the core component in place. The core component 120 of the present embodiment thus differs from the core component 20 of the previous embodiment in respect of how the core is held in place when fully inserted. The core component 120 also comprises a first inferior inter-engaging formation and a second inferior inter-engaging formation which are towards the lower side of the core component and spaced apart from each other. The first and second inferior inter-engaging formations are of the same form and function as the first and second superior inter-engaging formations 130, 131 albeit with the exception of their cooperation with the superior component 170 or indeed with the inferior component 140 in view of the identical form of inferior and superior components.

Each of the superior and inferior components 170, 140 of the ALIF device has a range of length by width from 25 mm by 25 mm to 40 mm by 35 mm. Each of the superior and inferior components has a range of height from 1 mm to 4 mm. The core component 120 has a range of length by width from 25 mm by 25 mm to 35 mm by 35 mm. The core component has a range of height from 4 mm to 12 mm.

Figure 5A:
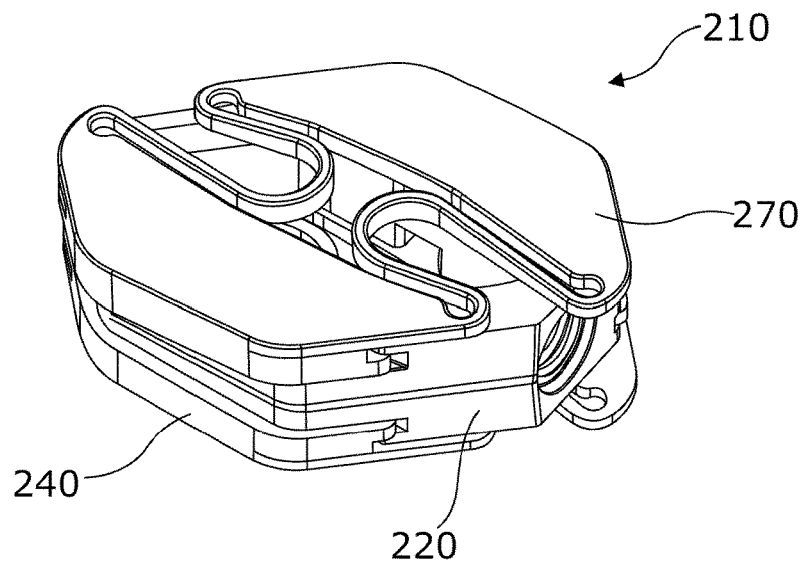
FIG. 5A is a perspective view of a third embodiment of intervertebral fusion device when fully assembled.

A perspective view of a third embodiment of intervertebral fusion device 210 is shown in FIG. 5A when fully assembled and installed in an intervertebral space of a patient. The third embodiment of intervertebral fusion device 210 is an oblique lumbar intervertebral fusion (OLIF) device. An OLIF device is introduced to the intervertebral space from the oblique direction of the patient. The OLIF device 210 comprises a core component 220, an inferior component 240 and a superior component 270. The form and function of the OLIF device 210 are the same as the form and function of the lateral intervertebral fusion device 10 described above with exception of configuration for use in an oblique lumbar procedure instead of a lateral procedure. Orientation of features of the OLIF device 210 therefore differs from orientation of features of the lateral intervertebral fusion device 10 to reflect this change in direction of procedure.

Figure 5B:
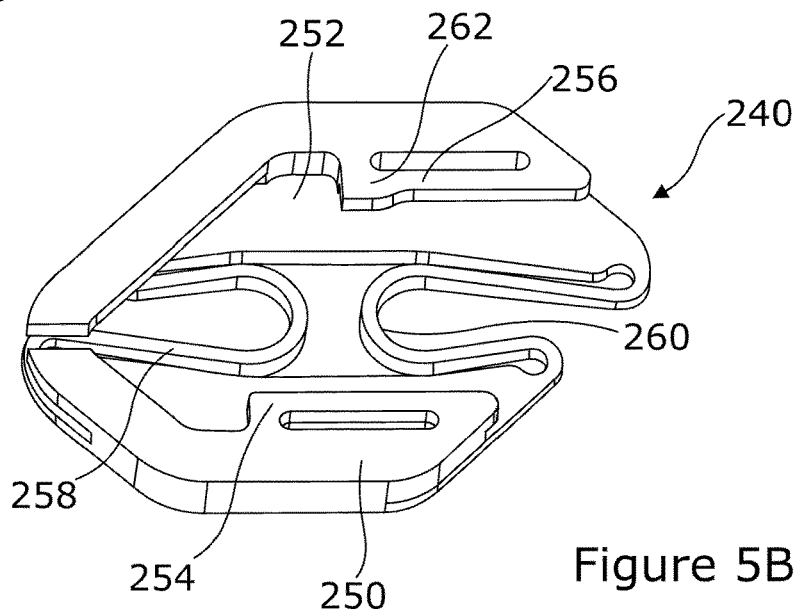
FIG. 5B is a perspective view of the inferior component of the third embodiment.

A perspective view of the inferior component 240 of the OLIF device 210 is shown in FIG. 5B. The superior component 270 of the OLIF device 210 is the same as the inferior component 240 of the OLIF device 110 subject to mirroring with respect to each other about a bisecting plane that extends in the oblique direction. Considering the inferior component 240 further, the inferior component 240 comprises a first inferior component part 250 and a second inferior component part 252 which move apart and together to provide for expansion and contraction of the inferior component, as described above with reference to the lateral intervertebral fusion device 10. Likewise, the first inferior part 250 defines a first inferior part formation 254 and the second inferior part 252 defines a second inferior part formation 256. The first and second inferior part formations 254, 256 are spaced apart from and oppose each other. Although the first and second inferior part formations 254, 256 of the present embodiment are of different form to the first and second inferior part formations 54, 56 of the previous embodiment, they still cooperate with the core component to force the first and second inferior parts 250, 252 apart upon insertion of the core component 220.

The inferior component 240 also comprises an expandable structure. The expandable structure comprises a first sprung member 258 and a second sprung member 260 which each mechanically couple the first and second parts to each other. The first and second sprung members 258, 260 are spaced apart along a direction of insertion of the core component between the superior and inferior components. Each of the first and second sprung members 258, 260 has the form of a loop which lies in a plane substantially parallel to a plane in which the first and second inferior part formations 254, 256 lie. Each of the first and second sprung members 258, 260 is biased by way of the material of which it is formed and its shape to draw the first and second inferior parts 250, 252 together whereby the inferior component 240 is biased towards the contracted condition. The expandable structure of the present embodiment is therefore of corresponding form and function to the expandable structure of the previous embodiments.

Figure 5C:
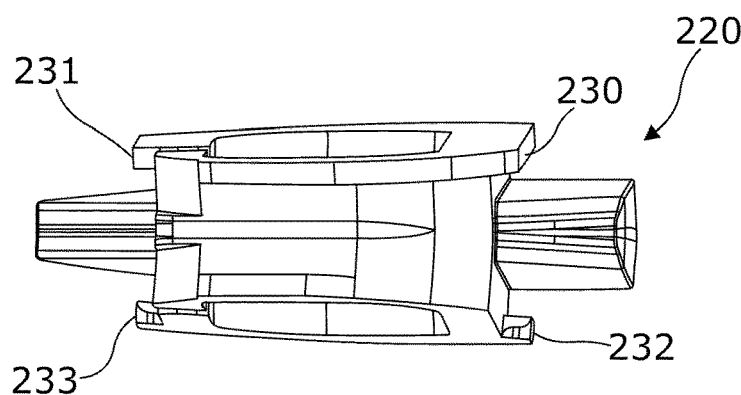
FIG. 5C is an end view of the core component of the third embodiment.

An end view of the core component 220 of the OLIF device 210 is shown in FIG. 5C. In common with the previous embodiments, the core component 220 of the present embodiment is wedge shaped but with profiles which cooperate with each of the superior component 270 and the inferior component 240 extending in a direction oblique to the direction of the taper of the wedge. Considering the profiles further, the core component 220 comprise a first superior inter-engaging formation 230 and a second superior inter-engaging formation 231 which are towards the upper side of the core component and spaced apart from each other. Each of the first and second superior inter-engaging formations 230, 231 defines a keyway for receiving and slidably inter-engaging with a respective one of first and second superior part formations. The keyways defined by the first and second superior inter-engaging formations 230, 231 therefore face in opposite directions with each keyway extending obliquely to a direction of taper of the core component. As per the second embodiment, the second superior inter-engaging formation 231 defines a slot. The second superior part formation defines a protrusion. When the core component 220 is fully inserted between the superior and inferior components 240, 270, the protrusion is received in the slot to thereby hold the core component in place. The core component 220 also comprises a first inferior inter-engaging formation 232 and a second inferior inter-engaging formation 233 which are towards the lower side of the core component and spaced apart from each other. Although the first and second inferior inter-engaging formations 232, 233 have differently shaped and located profiles to the first and second superior inter-engaging formations 230, 231, the first and second inferior inter-engaging formations slidably inter-engage with the inferior component 240 in the same fashion as for the superior component 270 to put the inferior component 240 in the expanded condition. When the core is fully inserted, the protrusion 262 of the inferior component is received in a slot in the core component to thereby hold the core component in place.

Each of the superior and inferior components 270, 240 of the OLIF device 210 has a range of length by width from 25 mm by 16 mm to 45 mm by 25 mm. Each of the superior and inferior components has a range of height from 1 mm to 4 mm. The core component 220 has a range of length by width from 25 mm by 16 mm to 45 mm by 20 mm. The core component has a range of height from 4 mm to 12 mm.

The invention claimed is:

1. An intervertebral fusion device comprising:
    a superior component having a superior component top side and a superior component bottom side, the superior component configured to be received in an intervertebral space between first and second vertebrae whereby the superior component top side abuts against the first vertebra, the superior component comprising first and second superior parts which are coupled to each other to allow the first and second superior parts to move apart to thereby increase a perimeter of the superior component top side;
    an inferior component having an inferior component top side and an inferior component bottom side, the inferior component configured to be received in the intervertebral space between the first and second vertebrae whereby the inferior component bottom side abuts against the second vertebra, the superior component bottom side and the inferior component top side opposing each other when the superior and inferior components are received in the intervertebral space, the inferior component comprising first and second inferior parts which are coupled to each other to allow the first and second inferior parts to move apart to thereby increase a perimeter of the inferior component bottom side; and
    a core component configured for insertion between the superior and inferior components whereby separation between the superior and inferior components is determined, the core component inter-engaging with each of the superior and inferior components upon insertion, and the core component is integrally formed,
    wherein the superior and inferior components are unattached to each other before the core component is inserted between the superior and inferior components, and
    wherein, as the core component is progressively inserted between the superior and inferior components, the core component: bears against the first and second superior parts to push the first and second superior parts progressively apart; and bears against the first and second inferior parts to push the first and second inferior parts progressively apart.

2. The intervertebral fusion device according to claim 1, wherein the core component comprises a core component superior formation, which bears against the first and second superior parts during insertion of the core component to push the first and second superior parts progressively apart, and a core component inferior formation, which bears against the first and second inferior parts during insertion of the core component to push the first and second inferior parts progressively apart.

3. The intervertebral fusion device according to claim 2, wherein the first superior part defines a first superior part formation and the second superior part defines a second superior part formation, the core component superior formation bearing against the first and second superior part formations simultaneously to push the first and second superior parts apart during insertion of the core component.

4. The intervertebral fusion device according to claim 3, wherein the core component superior formation and the first and second superior part formations are shaped and relatively disposed for sliding movement of the core component superior formation relative to the first and second superior part formations while the core component superior formation inter-engages with the first and second superior part formations.

5. The intervertebral fusion device according to claim 2, wherein the first inferior part defines a first inferior part formation and the second inferior part defines a second inferior part formation, the core component inferior formation bearing against the first and second inferior part formations simultaneously during insertion of the core component to push the first and second inferior parts progressively apart.

6. The intervertebral fusion device according to claim 1, wherein each of the superior component and the inferior component comprises an expandable structure which mechanically couples its respective first and second parts, and wherein the expandable structure is biased to draw the respective first and second parts together whereby each of the superior component and the inferior component is biased towards a contracted condition.

7. The intervertebral fusion device according to claim 6, wherein the expandable structure of each of the superior and inferior components comprises first and second sprung members which each couple the respective first and second parts, and wherein the first and second sprung members are spaced apart along a direction of insertion of the core component between the superior and inferior components.

8. The intervertebral fusion device according to claim 7, wherein the expandable structure is integrally formed with the respective first and second parts.

9. The intervertebral fusion device according to claim 1, wherein the core component has a first end and a second end opposite to the first end, the first end received between the superior and inferior components before the second end when the core component is inserted between the superior and inferior components, and
    wherein the core component comprises a core component superior formation, which protrudes from an upper side of the core component, and a core component inferior formation, which protrudes from a lower side of the core component, and wherein each of the core component superior formation and the core component inferior formation extends from the first end no more than 10% along a length of the core component extending from the first end to the second end.

10. The intervertebral fusion device according to claim 9, wherein the first superior part defines a first superior part formation and the second superior part defines a second superior part formation, the first inferior part defines a first inferior part formation and the second inferior part defines a second inferior part formation, each of the core component superior formation and the core component inferior formation define first and second keyways which extend along the length of the core component and which face in opposite directions, the first and second keyways of the core component superior formation slidably receiving the first and second superior part formations, and the first and second keyways of the core component inferior formation slidably receiving the first and second inferior part formations.

11. The intervertebral fusion device according to claim 9, wherein the core component further comprises a superior inter-engaging formation, which protrudes from the upper side of the core component, and an inferior inter-engaging formation, which protrudes from the lower side of the core component, the superior inter-engaging formation extending along the length of the core component generally in line with the core component superior formation, and the inferior inter-engaging formation extending along the length of the core component generally in line with the core component inferior formation, and wherein there is a first gap between the superior inter-engaging formation and the core component superior formation, and a second gap between the inferior inter-engaging formation and the core component inferior formation.

12. The intervertebral fusion device according to claim 11, wherein each of the superior inter-engaging formation and the inferior inter-engaging formation extends to the second end of the core component.

13. The intervertebral fusion device according to claim 11, wherein the first superior part defines a first superior part formation and the second superior part defines a second superior part formation, the first inferior part defines a first inferior part formation and the second inferior part defines a second inferior part formation, each of the core component superior formation and the core component inferior formation define first and second keyways which extend along the length of the core component and which face in opposite directions, the first and second keyways of the core component superior formation slidably receiving the first and second superior part formations, and the first and second keyways of the core component inferior formation slidably receiving the first and second inferior part formations, and wherein each of the superior inter-engaging formation and the inferior inter-engaging formation defines first and second keyways with each of the first and second keyways extending along the length of the core component, the first and second keyways facing in generally opposite directions, and wherein the first and second keyways of the superior inter-engaging formation are respectively in registration with the first and second keyways of the core component superior formation and the first and second keyways of the inferior inter-engaging formation are respectively in registration with the first and second keyways of the core component inferior formation.

14. The intervertebral fusion device according to claim 13, wherein spacing between the first and second keyways of each of the superior inter-engaging formation and the inferior inter-engaging formation increases progressively from an end of the inter-engaging formation closer to the respective one of the core component superior formation and the core component inferior formation to the opposite end of the inter-engaging formation.

15. The intervertebral fusion device according to claim 13, wherein each of the first and second superior part formations defines a slot with the thus defined slots in registration with each other and near a side of the superior component opposite the side of the superior component first receiving the core component on insertion of the core component, and wherein each slot is shaped to receive a respective one of opposite sides of the core component superior formation.

16. The intervertebral fusion device according to claim 13, wherein each of the first and second inferior part formations defines a slot with the thus defined slots in registration with each other and near a side of the inferior component opposite the side first receiving the core component on insertion of the core component, and wherein each slot is shaped to receive a respective one of opposite sides of the core component inferior formation.

17. The intervertebral fusion device according to claim 1 which is a lateral intervertebral fusion device, wherein the core component has the form of a wedge, and cooperating profiles of the core component and the superior and inferior components provide for slidable insertion of the core component between the superior and inferior components in a direction substantially orthogonal to the direction of a taper defined by the wedge.

18. The intervertebral fusion device according to claim 1 which is an anterior lumbar interbody fusion (ALIF) device, wherein the core component has the form of a wedge, and cooperating profiles of the core component and the superior and inferior components provide for slidable insertion of the core component between the superior and inferior components in substantially the same direction as the direction of a taper defined by the wedge.

19. The intervertebral fusion device according to claim 1 which is an oblique lumbar interbody fusion (OLIF) device, wherein the core component has the form of a wedge, and cooperating profiles of the core component and the superior and inferior components provide for slidable insertion of the core component between the superior and inferior components in a direction oblique to the direction of a taper defined by the wedge.

20. The intervertebral fusion device according to claim 1, wherein the core component is configured to mate with the superior and inferior components.

21. The intervertebral fusion device according to claim 1, wherein when the core component is fully inserted between the superior and inferior components, a lateral side of the core component is substantially in registration with an extended perimeter of the superior component and of the inferior component.

22. An intervertebral fusion device, comprising:
 a superior component having a superior component top side and a superior component bottom side, the superior component configured to be received in an intervertebral space between first and second vertebrae whereby the superior component top side abuts against the first vertebra, the superior component comprising first and second superior parts which are coupled to each other to allow the first and second superior parts to move apart to thereby increase a perimeter of the superior component top side;
 an inferior component having an inferior component top side and an inferior component bottom side, the inferior component configured to be received in the intervertebral space between the first and second vertebrae whereby the inferior component bottom side abuts against the second vertebra, the superior component bottom side and the inferior component top side opposing each other when the superior and inferior components are received in the intervertebral space, the inferior component comprising first and second inferior parts which are coupled to each other to allow the first and second inferior parts to move apart to thereby increase a perimeter of the inferior component bottom side; and
 a core component configured for insertion between the superior and inferior components whereby separation between the superior and inferior components is determined, the core component inter-engaging with each of the superior and inferior components upon insertion, wherein the superior and inferior components are unattached to each other before the core component is inserted between the superior and inferior components, wherein, as the core component is progressively inserted between the superior and inferior components, the core component: bears against the first and second superior parts to push the first and second superior parts progressively apart; and bears against the first and second inferior parts to push the first and second inferior parts progressively apart, wherein the core component comprises a core component superior formation, which bears against the first and second superior parts during insertion of the core component to push the first and second superior parts progressively apart, and a core component inferior formation, which bears against the first and second inferior parts during insertion of the core component to push the first and second inferior parts progressively apart, wherein the first superior part defines a first superior part formation and the second superior part defines a second superior part formation, the core component superior formation bearing against the first and second superior part formations simultaneously to push the first and second superior parts apart during insertion of the core component, and wherein the first and second superior part formations oppose each other and are spaced apart from each other, a size of a gap between the first and second superior part formations decreases progressively in a direction of insertion of the core component between the superior and inferior components, and the gap is at its widest towards an end of the superior component that first receives the core component upon insertion of the core component.

* * * * *